(12) United States Patent
Confalonieri

(10) Patent No.: US 8,392,683 B1
(45) Date of Patent: Mar. 5, 2013

(54) DYNAMIC RANGE UNLOCK OR LOCK MEMORY DEVICE AND METHOD TO OPERATE THE SAME

(75) Inventor: Emanuele Confalonieri, Lesmo (IT)

(73) Assignee: Micron Technology, Inc., Boise, ID (US)

( * ) Notice: Subject to any disclaimer, the term of this patent is extended or adjusted under 35 U.S.C. 154(b) by 615 days.

(21) Appl. No.: 12/628,166

(22) Filed: Nov. 30, 2009

(51) Int. Cl.
*G06F 12/00* (2006.01)

(52) U.S. Cl. .................... 711/163; 711/103; 711/173

(58) Field of Classification Search .................... None
See application file for complete search history.

(56) References Cited

U.S. PATENT DOCUMENTS

| 2006/0174056 A1* | 8/2006 | Lambert et al. ............... 711/103 |
| 2008/0189557 A1* | 8/2008 | Pipitone et al. ............... 713/193 |
| 2010/0058087 A1* | 3/2010 | Borras et al. .................. 713/322 |

\* cited by examiner

*Primary Examiner* — Shawn X Gu

(74) *Attorney, Agent, or Firm* — Schwegman, Lundberg & Woessner, P.A.

(57) ABSTRACT

A non-volatile memory device with dynamic allocable regions that are unlocked or locked. Unlocking and/or locking is performed on one region or on multiple regions simultaneously, each region being identified by respective start address and end address. The start and end addresses of a dynamic allocable region need not coincide with physical addresses of a partition.

17 Claims, 9 Drawing Sheets

| Byte-Addressing Offset (Bytes) | # of bytes (decimal) | Type | Register Item | Default Value (hex) |
|---|---|---|---|---|
| 0x001 – 0x000 | 2 | R | Overlay Window Query String "P" | 0x00 - 0x50 |
| 0x003 – 0x002 | 2 | R | Overlay Window Query String "F" | 0x00 - 0x46 |
| 0x005 – 0x004 | 2 | R | Overlay Window Query String "O" | 0x00 - 0x4F |
| 0x007 – 0x006 | 2 | R | Overlay Window Query String "W" | 0x00 - 0x57 |
| 0x009 – 0x008 | 2 | R | Overlay Window ID | 0x00 - 0x20 |
| 0x00B – 0x00A | 2 | R | Overlay Window Revision | TBD |
| 0x00D – 0x00C | 2 | R | Overlay Window Size | 0x1000 |
| 0x00F – 0x00E | 2 | - | Reserved for JEDEC | - |
| 0x011 – 0x010 | 2 | R | Program-Buffer Offset | 0x0800 |
| 0x013 – 0x012 | 2 | R | Program-Buffer Size | 0x0400 |
| 0x021 – 0x020 | 2 | R | JEDEC Manufacturer ID | 0x00FE |
| 0x023 – 0x022 | 2 | R | JEDEC Device ID | TBD |
| 0x03F – 0x024 | 28 | - | Reserved for JEDEC | - |
| 0x07F – 0x040 | 64 | - | Reserved | Vendor-Specific |

FIG. 7A

| Byte-Addressing Offset (Bytes) | # of bytes (decimal) | Type | Register Item | Default Value (hex) |
|---|---|---|---|---|
| 0x081 – 0x080 | 2 | R/W | Command Code | 0x00 - 0x00 |
| 0x083 – 0x082 | 2 | - | Reserved for JEDEC | - |
| 0x087 – 0x084 | 4 | R/W | Command Data | - |
| 0x08B – 0x088 | 4 | R/W | Command Add | - |
| 0x08F – 0x08C | 4 | - | Reserved for JEDEC | - |
| 0x093 – 0x090 | 4 | R/W | Multi-Purpose Register | - |
| 0x0BF – 0x094 | 44 | - | Reserved for JEDEC | - |
| 0x0C1 – 0x0C0 | 2 | R/W | Command Execute | 0x00 - 0x00 |
| 0x0C7 – 0x0C2 | 6 | - | Reserved for JEDEC | - |
| 0x0C9 – 0x0C8 | 2 | R/W | Suspend | 0x00 - 0x00 |
| 0x0CB – 0x0CA | 2 | R/W | Abort | 0x00 - 0x00 |
| 0x0CD – 0x0CC | 2 | R/W | Status Register | 0x00 - 0x80 |
| 0x0CF – 0x0CE | 2 | - | Reserved for JEDEC | - |
| 0x0D3 – 0x0D0 | 64 | - | Reserved | Vendor-Specific |
| ... | ... | ... | ... | ... |

FIG. 7B

DYNAMIC RANGE UNLOCK OR LOCK MEMORY DEVICE AND METHOD TO OPERATE THE SAME

TECHNICAL FIELD

The present invention relates to memory devices and more specifically to non-volatile memory devices with unlock-lock capability to prevent undesired data alteration in a region of memory cells. A locked region is one that the user is not allowed to write to, while an unlocked region is one in which the user may change data.

BACKGROUND OF THE INVENTION

Non-volatile memory devices are becoming more and more widespread as the request for data storage continues to increase with present electronic applications. Flash EEPROMs memories, either with NAND or with NOR architecture, are the most popular type of non-volatile memory because of a number of advantages, among which are high integration density, fast write/erase speed, and compatibility with conventional CMOS processes.

One important feature of non-volatile memories is their security, especially to avoid undesired, accidental modification of existing data in the memory.

Modern applications need to access to the memory with a fine and varied granularity, and often the information stored has different requirements in terms of protection from accidental modification. In some cases the data or programs require a limited memory space. Moreover, the memory content changes several times during its life in the field.

BRIEF DESCRIPTION OF THE DRAWINGS

The features and advantages of the present invention will be made apparent by the following detailed description of some embodiments thereof, illustrated merely by way of non-limiting examples in the annexed drawings, wherein:

FIGS. 7A and 7B illustrate the organization of the overlay window according to another embodiment of the invention in compliance with the LPDDR2-NMV JEDEC 42.6 standard.

It will be appreciated that for simplicity and clarity of illustration, elements illustrated in the figures have not necessarily been drawn to scale. For example, the dimensions of some of the elements may be exaggerated relative to other elements for clarity.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Figure 1:
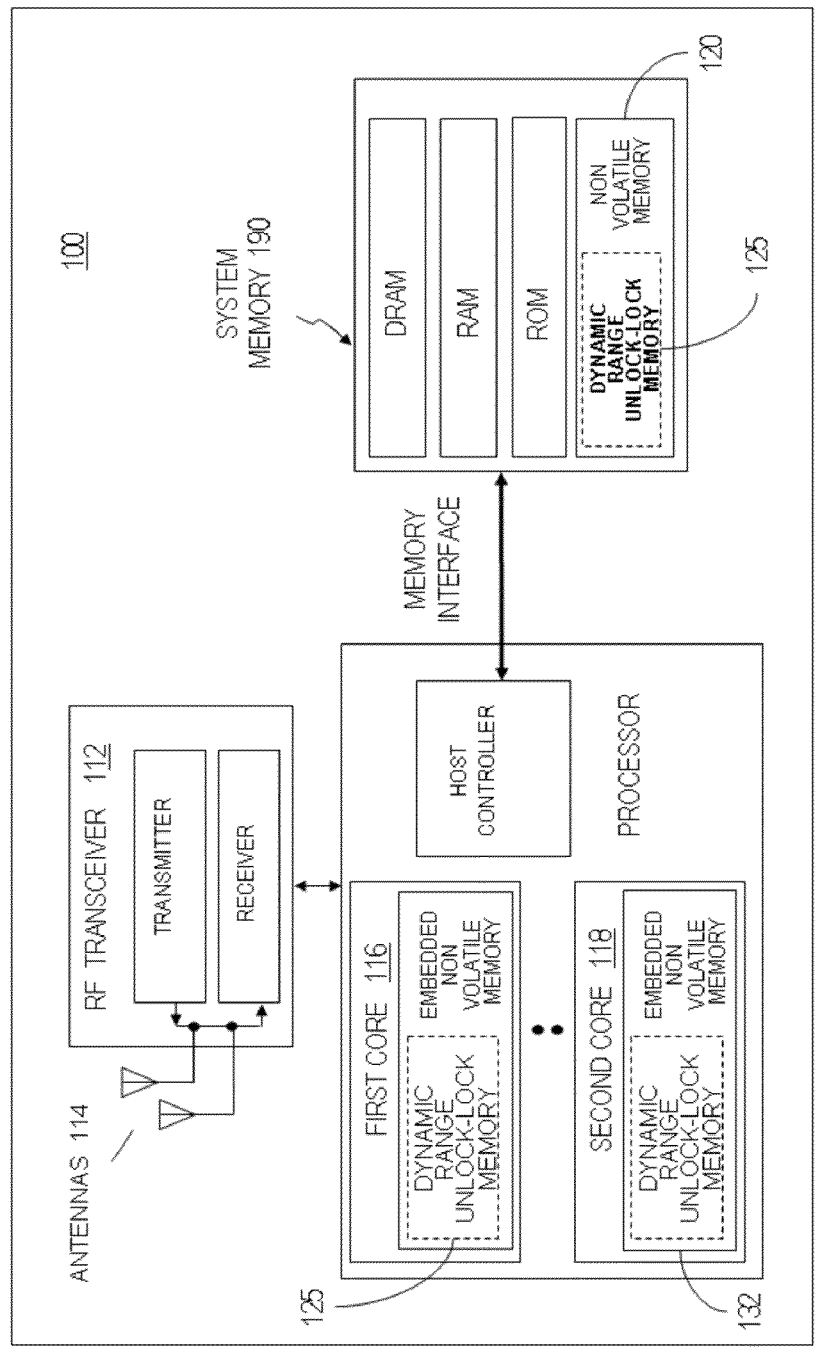
FIG. 1 illustrates a wireless architecture that incorporates a memory with dynamic range unlock-lock capabilities in accordance with one embodiment of the present invention.

The wireless architecture embodiment illustrated in FIG. 1 shows a communications device 100 that includes non-volatile memory with dynamic range unlock-lock capability in accordance with one embodiment of the present invention. It should be noted that the present invention is not limited to wireless communication embodiments and other, non-wireless applications may use the present invention. As shown in this wireless embodiment, communications device 100 includes one or more antenna structures 114 to allow radios to communicate with other over-the-air communication devices. As such, communications device 100 may operate as a cellular device or a device that operates in wireless networks such as, for example, Wireless Fidelity (Wi-Fi) that provides the underlying technology of Wireless Local Area Network (WLAN) based on the IEEE 802.11 specifications, WiMax and Mobile WiMax based on IEEE 802.16-2005, Wideband Code Division Multiple Access (WCDMA), and Global System for Mobile Communications (GSM) networks, although the present invention is not limited to operate in only these networks. Additional radio subsystems (not shown in FIG. 1) may be collocated in the same platform of communications device 100 with the capability of communicating with different frequency bands in an RF/location space with other devices in a network. It should be understood that the scope of the present invention is not limited by the types of, the number of, or the frequency of the communication protocols that may be used by communications device 100.

The embodiment of FIG. 1 illustrates the coupling of antenna structure 114 to a transceiver 112 to accommodate modulation/demodulation. In general, analog front end transceiver 112 may be a stand-alone Radio Frequency (RF) discrete or integrated analog circuit, or transceiver 112 may be embedded with a processor having one or more processor cores 116 and 118. The multiple cores allow processing workloads to be shared across the cores and handle baseband functions and application functions. The processor communicates with a memory storage in a system memory 190 through a memory interface. Although the scope of the present invention is not limited in this respect, the interface may comprise serial and/or parallel buses to share information along with control signal lines to be used for handshaking between the processor and system memory 190; in one embodiment the interface uses a LPDDR2 protocol.

The system memory 190 may be used to store instructions that are executed by the processor during the operation of wireless communication device 100, and may be used to store user data such as the conditions for when a message is to be transmitted by wireless communication device 100 or the actual data to be transmitted. For example, the instructions stored in system memory 190 may be used to perform wireless communications, ensure security functionality for communication device 100, user functionality such as calendaring, email, internet browsing, etc.

System memory 190 may comprise one or more different types of memory (i.e. DRAM, SRAM, RAM, ROM, etc.) and may include both volatile and a non-volatile memory 120 (described in more detail below).

The volatile and non-volatile memories may be combined in a stacking process to reduce the footprint on a board, packaged separately, or placed in a multi-chip package with the memory component placed on top of the processor. The embodiment also illustrates that one or more of the processor cores may be embedded with non-volatile memory 132. In another embodiment the system memory 190 includes only one type of memory device, for example of the Phase Change Memory type (PCM or PCRAM), of the Ferro-electric type (FeRAM), or of the Magnetic type (MRAM).

The non-volatile memory 120 and/or the embedded non-volatile memory 132, if present, comprise a dynamically allocable region as described subsequently.

Figure 2:
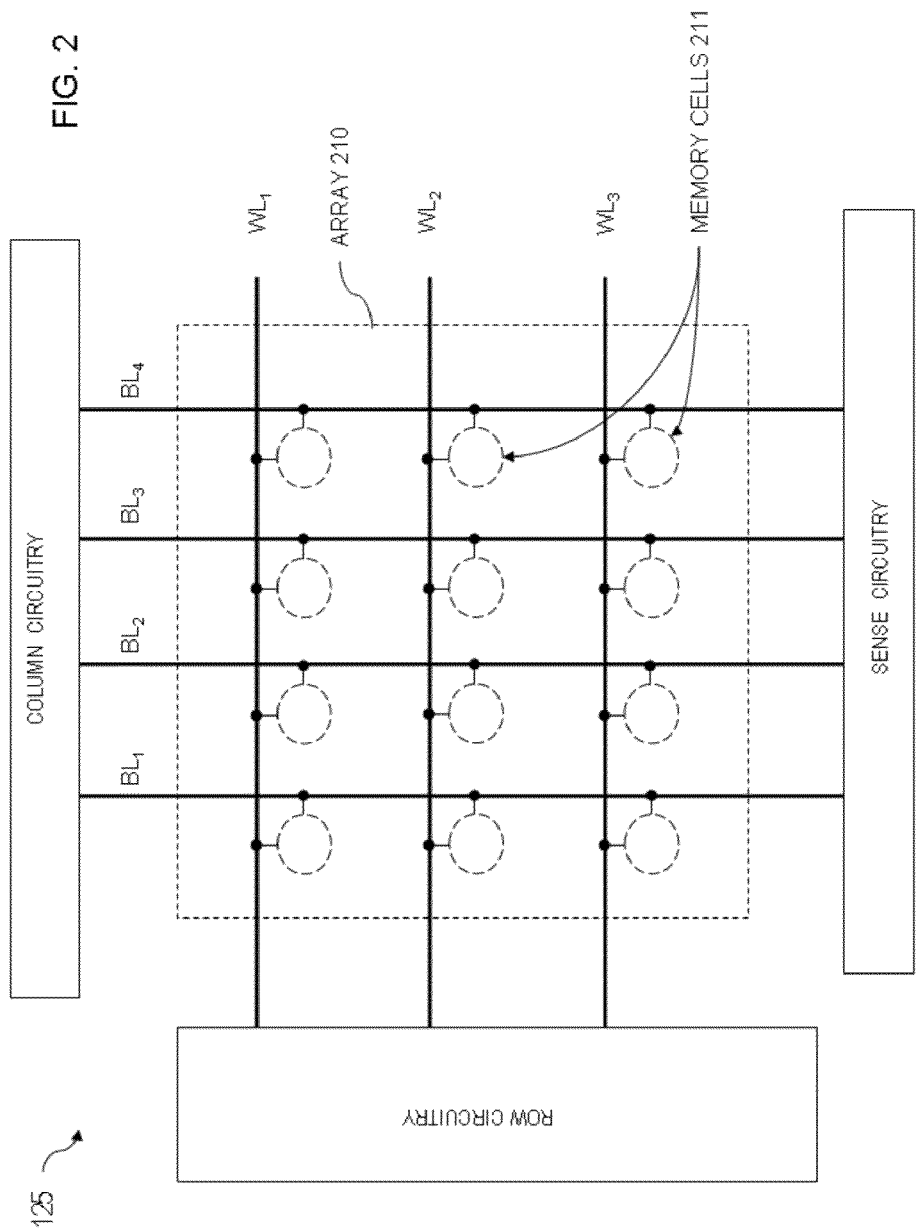
FIG. 2 illustrates schematically a portion of an array of the memory device according to an embodiment of the invention.

FIG. 2 schematically illustrates a portion 125 of the memory device in system memory 120 and/or the embedded non-volatile memory 132 in processor cores 116 and 118 (see FIG. 1). The memory array 210 includes a plurality of memory cells 211 organized in rows, or word lines ($WL_N$), and columns, or bit lines ($BL_N$). The word lines are coupled to row circuitry and the bit lines are coupled to column circuitry. The row and the column circuitry perform the decoding of the logical address of a memory cell to its physical address, i.e., on the appropriate word line and bit line. The bit lines are also coupled to a sensing circuitry for reading the information stored in the memory cell. The design of these circuitries depends on the kind of memory selected for implementing the different embodiments of the invention (see below for some examples of memory types).

Figure 3:
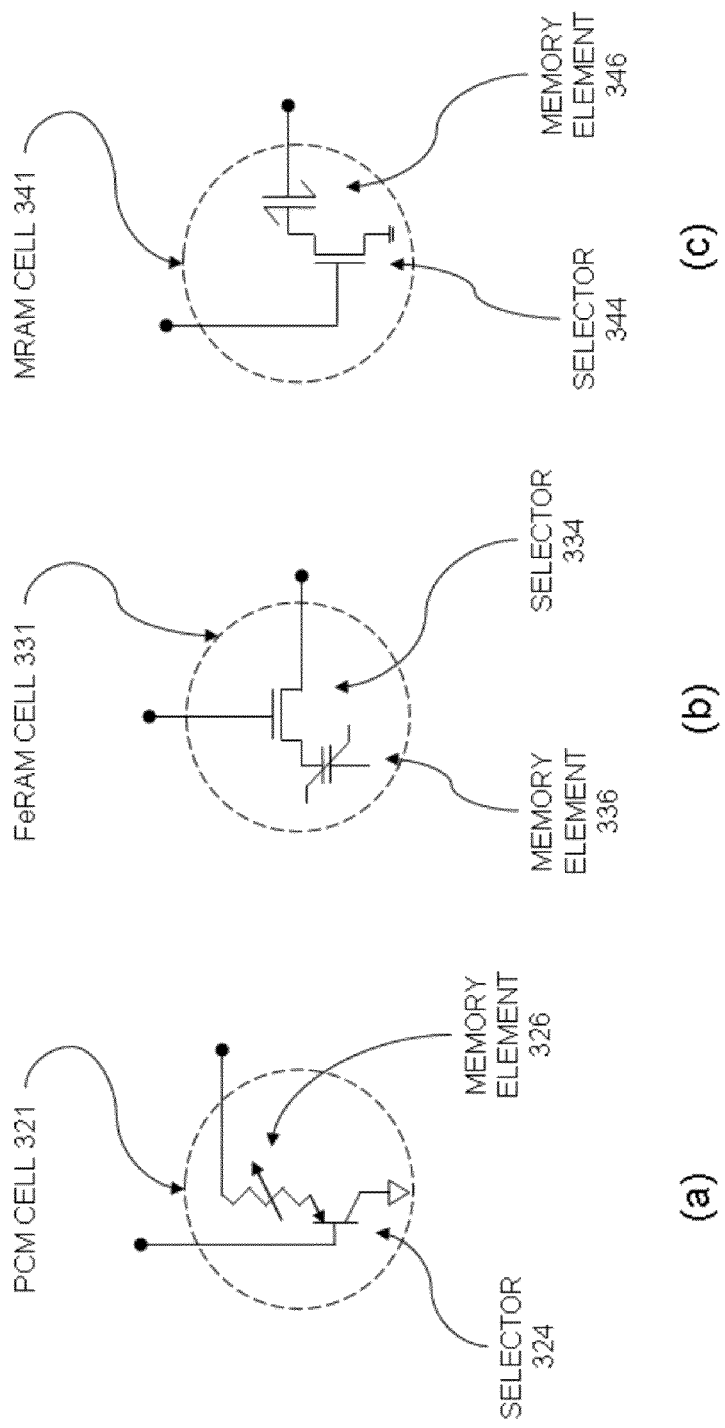
FIG. 3 illustrates some examples of memory cell to be used in the array of FIG. 2.

Several of different types of non-volatile memory may be utilized when practicing embodiments of the invention, of which, FIG. 3 illustrates some examples thereof. In one embodiment, a Phase Change Memory (PCM) cell 321 is used (FIG. 3(a)). The PCM cell includes alloys of elements of group VI of the periodic table, elements such as Te or Se that are referred to as chalcogenides or chalcogenic materials. Chalcogenides may be used advantageously in phase change memory cells, ensure data retention and remain stable even after the power is removed from the non-volatile memory. Taking the phase change material as $Ge_2Sb_2Te_5$ for example, two phases or more are exhibited having distinct electrical characteristics useful for memory storage.

In this embodiment, array 210 includes memory cells 321 each having a selector device 324 and a memory element 326. Although the array is illustrated with bipolar selector devices, it should be noted that alternative embodiments may use CMOS selector devices or diodes to identify and selectively change the electrical properties (e.g. resistance, capacitance, etc.) of the chalcogenide material through the application of energy such as, for example, heat, light, voltage potential, or electrical current.

To alter the state or phase of the memory material, one embodiment uses a programming voltage potential that is greater than the threshold voltage of the memory device that may be applied to the memory cell. An electrical current flows through the PCM cell and generates heat that changes the electrical characteristic the of the memory material and alters its phase state, to which a memory state is associated. In one embodiment, the heat is generated by ohmic heating of a heater element coupled between the selector device and the chalcogenic material. By way of example, heating the phase-change material to a temperature above 900° C. in a write operation places the phase change material above its melting temperature. Then, a rapid cooling places the phase-change material in the amorphous state that is referred to as a reset state where stored data may have a "0" value. Taking $Ge_2Sb_2Te_5$ as an example, the time between achieving the melting temperature and quenching after the local heating to achieve the amorphous phase may be less than 50 nanoseconds.

On the other hand, to program a memory cell from reset to set, the chalcogenic material is heated so that the local temperature is raised above the crystallization temperature and then cooled at a relatively slow rate, i.e. for a time longer than 50 ns (for $Ge_2Sb_2Te_5$), to allow crystallization to complete. The phase-change material in the crystalline form is referred to as a set state and stored data may have a "1" value. Thus, the cell can be programmed by setting the amplitude and pulse width of the current that will be allowed through the cell. In summary, a higher magnitude, fast pulse will amorphize the cell, whereas a moderate magnitude, longer pulse will allow the cell to crystallize. The chalcogenic material may be electrically switched between different states intermediate between the amorphous and the crystalline states, thereby giving rise to a multilevel storing capability. In this case only a partial amorphization of the chalcogenic material is obtained. Of course, the logical "0" and "1" values may be the opposite of what has been described above.

In a read operation, the bit line (BL) and word line (WL) are selected and an electrical quantity is supplied to the selected memory cell. To read a chalcogenide memory device, the difference of an electrical quantity resulting from the different device resistance is sensed. For example, a voltage may be applied and a difference in the driven current is sensed. Alternatively, a current is forced and a difference between the voltage necessary to sustain the current is sensed. It is then determined whether data stored in the selected memory cell is a "1" or "0" based on a current/voltage difference caused by a resistance of the phase-change material of the selected memory cell. It is to be appreciated that the association of reset and set with amorphous and crystalline states, respectively, is a convention and that at least an opposite convention may be adopted.

In another embodiment, Ferroelectric Memory (FeRAM) cells 331 (FIG. 3(b)) are used in the memory array 210.

A FeRAM cell may be a one transistor cell, or alternatively, the transistor-capacitor cell 331 that is illustrated in FIG. 3(b). Typically the selector element 334 is a CMOS transistor. The capacitor 336 includes the ferroelectric material and a bi-stable atom in the ferroelectric material is shifted to form two stable polarization states. Memory cell data may be written by positively or negatively orienting the dipoles of the ferroelectric material via an applied polarizing voltage. Data may be read by detecting the voltage of the bit line (BL) connected with the memory cell. Current feed circuits, not shown, supply electric currents to the bit lines for a predetermined period from a start of a read operation, and read control circuitry senses the direction of the electric polarization as either a high or a low logic state. Each orientation is stable and remains in place even after the electric field is removed, preserving the data within the memory without periodic refresh.

In yet another embodiment, Magnetic Memory (MRAM) cells 341 (FIG. 3(c)) are used in the array 210. In a MRAM cell the magnetic storage elements 346 are formed from two ferromagnetic plates located at an intersection of a row and column line and selected by a Magnetic Tunnel Junction (MTJ) device 344. Current imparted to the row line in one direction causes a magnetic field operative on the MRAM cell 341 biasing the MRAM cell 341 toward a binary state. Due to a magnetic tunnel effect, the electrical resistance of the memory cell changes based on the orientation of the fields in the two plates 346.

Data may be written to the MRAM memory cells using a variety of means. In the simplest, each cell lies between a pair of write lines arranged at right angles to each other, above and below the cell (not shown in FIG. 2, where only a simplified architecture is illustrated and the depicted array needs known modifications to allow for MRAM programming/erasing). When current is passed through the write lines, an induced magnetic field is created at the junction, which the writable plate picks up. In another approach, referred to as the toggle mode, a multi-step write is used with a modified multi-layer cell. In yet another approach referred to as spin-torque-transfer (STT) or Spin Transfer Switching, spin-aligned ("polarized") electrons are used to directly torque the domains. Specifically, electrons flowing into a layer change their spin which develops a torque that transfers to the nearby layer.

Reading data stored in a Magnetic memory cell 341 is accomplished by measuring the electrical resistance of the cell. A particular cell is selected by powering an associated transistor 344 which switches current from a supply line through the cell to ground. Due to the magnetic tunnel effect, the electrical resistance of the cell changes due to the orientation of the fields in the two plates 346. By measuring the resulting current, the resistance inside the selected cell is determined, and from this the polarity of the writable plate. Typically, two plates having the same polarity may be considered to mean "0", while two plates of opposite polarity where the resistance is higher may be considered to mean "1".

The invention is not limited to the types of memory described above and other memories may be used. For example, Flotox-EEPROMs or Flash EEPROMs with a fine write/erase granularity.

The memory available to the user in a non-volatile memory device according to embodiments of the invention has different regions that are locked or unlocked (unlocked/locked). A locked region is one where the user is prevented from changing data, so that the information stored in a locked region is protected from undesired modification, and an unlocked region is one where it is possible to write into or erase from, for example when new data need to be stored in the non-volatile memory or deleted from it.

According to some embodiments of the invention described below, the size of the region to be unlocked or locked is dynamically adapted to be the dimension of interest in data modification. The size of the region may be definable on a memory cell level depending on the addressability of the memory cells of the memory device. If each memory cell is independently addressable, then the region may consist of particular memory cells or a plurality of them. A high level of flexibility in the identification and selection of the regions to be unlocked or locked is therefore possible. For example, this solution allows the identification of the regions to be unlocked or locked with very fine granularity, but also to identify very large regions, removing the link to block size found in NOR or NAND memories and therefore avoiding the need to decide at design level a specific hardware implementation of the memory blocks. Correspondingly, the limitation on the minimum size of the unlockable or lockable region in typical devices is overcome and the device area is optimized because it is not necessary to split the total logical memory space into many small memory blocks with the desired minimum granularity.

Several regions of the memory device may be simultaneously identified for unlocking or locking. Moreover, the positioning of the regions to be unlocked or locked in the logical memory space may be arbitrarily chosen during operation, as happens for the addresses of the memory cells to be written or erased, without any limitation related to the hardware implementation of the non-volatile memory space. After unlocking of one or more regions, data modification is permitted in these regions while it is prevented on the remaining portion of the non-volatile logical space (i.e., on unselected regions).

In one embodiment, the memory device at power on is in a default state and the entire non-volatile logical memory space in a locked state to prevent undesired data modification. During operation the regions that are to be modified (writing of new information into the device or erasing existing information from the device) are set to the unlocked state to allow the desired operation. At the end of the write or erase operation the interested regions are set again to a locked state to maintain them in a safe situation until the next data change is necessary.

Figure 4:
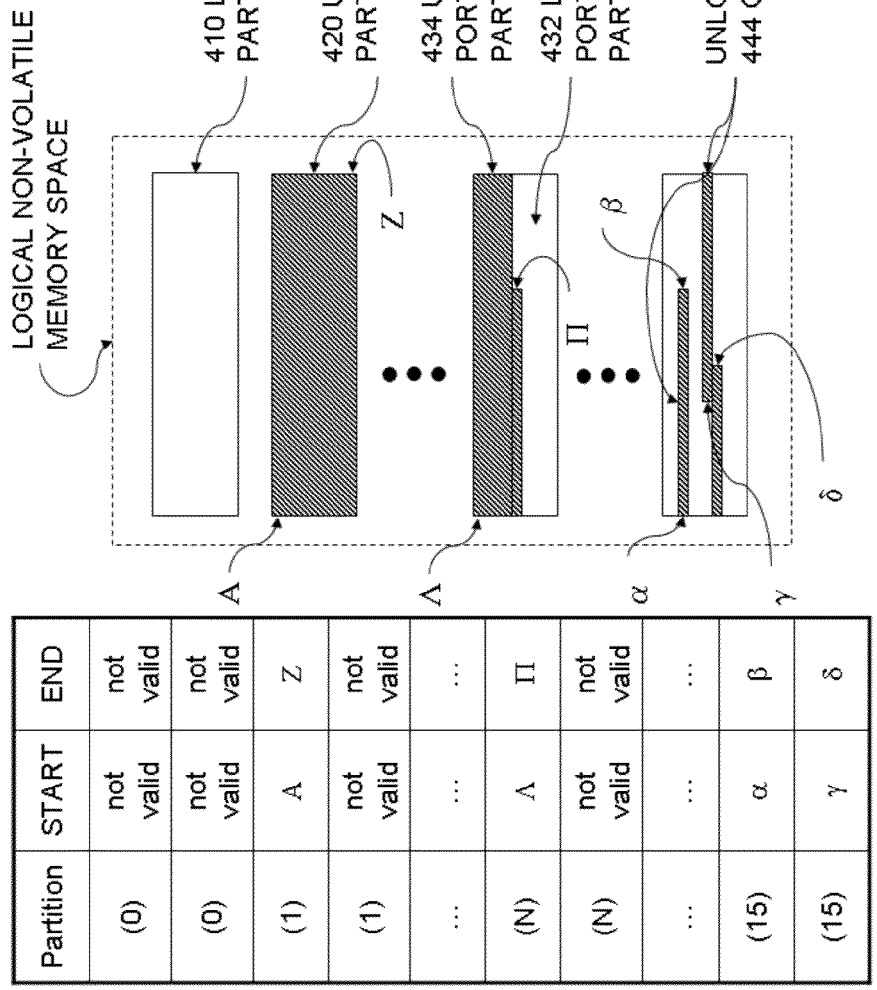
FIG. 4 illustrates a partitioning of the memory space with different unlocked-locked regions according to one embodiment of the invention.

FIG. 4 illustrates a partitioning of the logical non-volatile memory space, or the memory available to the user in the non-volatile memory device, with different unlocked and locked regions according to one embodiment of the invention. The logical non-volatile memory space is divided into partitions (in the depicted example from (0) to (15), but the number of partitions may be different and it depends on the device). Each partition includes up to a predetermined number of unlocked and locked regions that are individually and independently identifiable, for example using their start and end address. Alternatively, the unlocked and locked regions may be identified by their start address and the region's width, i.e. the extension of subsequent addresses starting from the start address of the region.

The start and end address information of each identified region is stored, for example, in dedicated registers schematically represented by the table on the left side in FIG. 4. These registers are on-chip, i.e. in the non-volatile memory 120 or in the embedded non-volatile memory 132. It should be understood that the information about the unlocked/locked regions (start and end address) may be alternatively stored in RAM, cache memory, etc.

In FIG. 4 each partition includes several regions that are independently unlockable (in the example shown, up to 2 regions in each partition are independently unlockable). Each region is identified by two registers respectively containing the start address and the end address of the region. To illustrate the several possible combinations different cases will be presented in the following with reference to the unlocked state (the symmetrical situation referring to the locked state is straightforward).

Partition (0) 410 has no region identified and unlocked. As such, the registers associated with the two regions in partition (0), the first two rows in the table, do not have valid content. Data modification is not allowed at any address in partition (0) 410. Therefore, this partition is protected from accidental overwriting.

Partition (1) 420 is completely unlocked and a single region is sufficient to define such a state. The start address of the unlocked region is A, and the end address of the unlocked region is Z, corresponding to the first and the last logical addresses of partition (1), respectively. The first pair of registers associated with the first region in partition (1) (shown as the third row of the table), contain the start and the end address (A, Z) of the unlocked region, while the content of the second pair of registers associated to the second region of partition (1) (the fourth row in the table) is marked as invalid. Data in partition (1) 420 may be changed.

Another possible situation is depicted in FIG. 4 with reference to partition (N). Partition (N) has a single unlocked region 434 whose start address coincides with the first logical address Λ in partition (N). However, the extension of the unlocked region 434 is smaller than the physical partition, as illustrated in FIG. 4, where the end address of the unlocked region in partition (N) is Π. The registers, see rows associated with partition (N) in the table, contain the start and the end address (Λ, Π) of the first unlocked region, while the content of the other pair of registers, associated to a possible second unlocked region in partition (N), is marked as invalid. The remaining portions 432 of partition (N) other than the unlocked region 434 are in a locked state and no data at an address in the locked region 432 may be altered. The start address of the unlocked region does not need to coincide the first logical address Λ, and may be any address within partition (N), as better clarified below.

In the example of FIG. 4, each partition has a maximum of 2 simultaneously unlocked regions and in general the start and/or end address of an identified region does not need to coincide with the first or the last address in a partition and maybe an arbitrary valid address in it. For example, partition (15) in FIG. 4 has two unlocked regions with start and end addresses (α, β) and (γ, δ), respectively. The table, i.e. the associated registers, contains the information corresponding to the start and end address for each region as shown in the last two rows of table, associated with partition # (15). Only data whose address is comprised within (α, β) and/or (γ, δ) may be changed, while data modification at other addresses is prevented.

The predetermined number of regions independently unlockable may be larger than 2, and this maximum number is chosen according to the expected degree of flexibility needed for the device. For example sufficient registers may be allocated to independently identify 4 or 8 regions in each partition.

Figure 5:
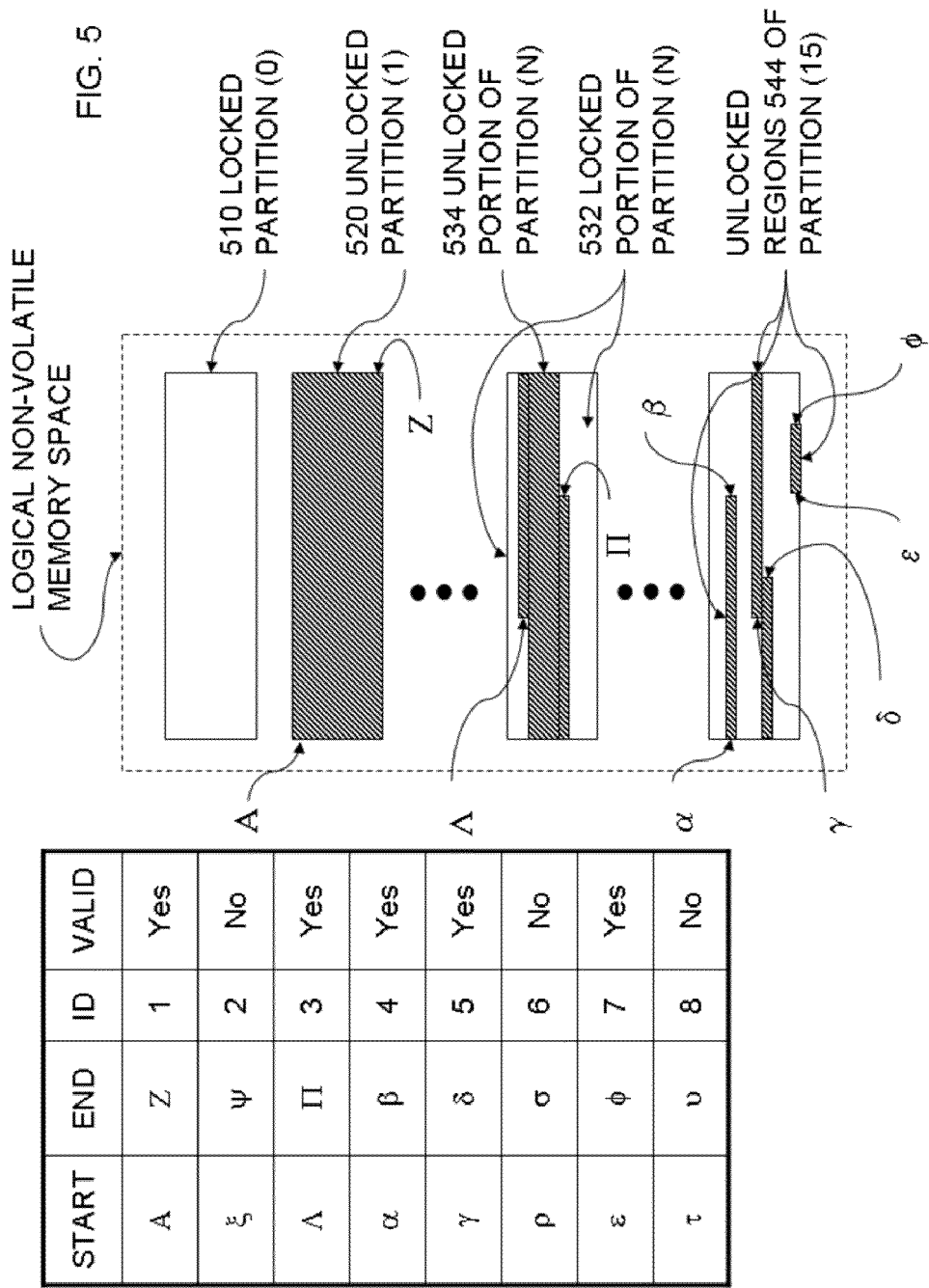
FIG. 5 illustrates a partitioning of the memory space with different unlocked-locked regions according to another embodiment of the invention.

Another embodiment is now described with reference to FIG. 5. In this embodiment a different organization of the total number of registers is used. More specifically the content of each pair of registers is allowed to span the whole address range of the logical memory space. With this organization the maximum number of unlocked regions in each partition is only limited by the total number of register pairs (if no other region is identified in the other partitions). In any case, the total number of simultaneously identified regions is limited by this maximum number, but independently from their location. This adds flexibility at constant number of start/end address registers. The registers to store start/end information are represented in FIG. 5 by the table on the left with similar meaning of what discussed with reference to FIG. 4. The optional use of registers corresponding to column ID will be discussed later.

In the example of FIG. 5, partition (0) 510 has no unlocked regions, so no register is used (therefore freeing them for other regions in other partitions).

Partition (1) 520 is completely unlocked and correspondingly a single pair of registers is needed to store the start and the end address (A, Z) of this region 520, see first row in the table at the left side of FIG. 5, without the need to allocate additional register pairs to partition (1).

A single region 534 is unlocked in partition (N) and correspondingly a single pair of registers is used to store the start and the end address of this region (Λ, Π) 534, see third row in the table at the left side of FIG. 5, without the need to allocate additional register pairs to partition (N). It is noted that in the case illustrated in FIG. 5 both start and end address (Λ, Π) are arbitrarily chosen within partition (N) therefore identifying a contiguous unlocked region 534 and two not contiguous regions 532 that are in the locked state.

Three regions 544 are unlocked in partition (15) and three pairs of registers are used to store the start and the end address of each region (α, β), (γ, δ) and (ε, φ), see fourth, fifth and seventh rows in the table at the left side of FIG. 5, respectively.

It is noted that, despite in the exemplification of FIG. 5 an additional unlocked region (ε, φ) is identified with respect to the example of FIG. 4, less registers are used (the table has only 8 rows rather than 16, under the assumption that no other unlocked region is present in all other partitions). Three entries (those whose content is not valid, i.e. (ξ, ψ) in the second row, (ρ, σ) in the sixth row and (τ, υ) in the eighth row of the table) are available for possible identification of additional regions in whichever partition of the logical memory space. If the number of registers is the same for the embodiments of FIG. 5 and FIG. 4, the embodiment of FIG. 5 typically has a better performance, and in any case at least not a worse one.

It is further noted that the extension of each region may be stored rather than its end address (i.e. the start address and the extension are stored in the associated registers, rather than the start and the end address of each region). This choice may apply to either of the embodiments described above. Moreover, while the description above considers that the information related to unlocked regions is stored in the registers, the opposite may also be stored, i.e. the information about the locked regions is stored.

As it will be explained in detail below, a region is unlocked by supplying the start and the end address of the region and an unlock command (and setting to valid the content of a validity bit or register if applicable—see fourth column of table in FIG. 5). The start and the end addressed are supplied along and a lock command to set the region back in the locked state and prevent undesired modification of data. Since all possible contents of the start or the end address correspond to a real address in the memory space, the latter operation is achieved by overwriting the validity bit associated to each pair of start/end addresses to mean that the content of the start/end address registers has to be disregarded.

In an alternative embodiment, an optional region identifier (register ID, represented by the third column in table of FIG. 5) may be used to directly select the desired region, for example to lock it, without the need to supply the start and the end address. The address content in the registers is turned to invalid by overwriting the validity bit. The region identifier ID may be implicitly associated with the start/end address registers, i.e. each pair of registers corresponds to an ID according to a pre-defined correspondence table (the first pair has ID=1, the second pair has ID=2, etc.).

In principle the maximum address range that may be unlocked or locked with a single operation is the entire memory space, i.e. start address equal to lowest valid address and end address equal to highest valid address. On the other hand the theoretically minimum unlockable or lockable range is a single bit (start address equal to end address of region). In one embodiment, the minimum unlocked or locked region corresponds to the number of contiguous words that are sensed simultaneously (i.e. in parallel), including the error correction bytes, if any.

Figure 6:
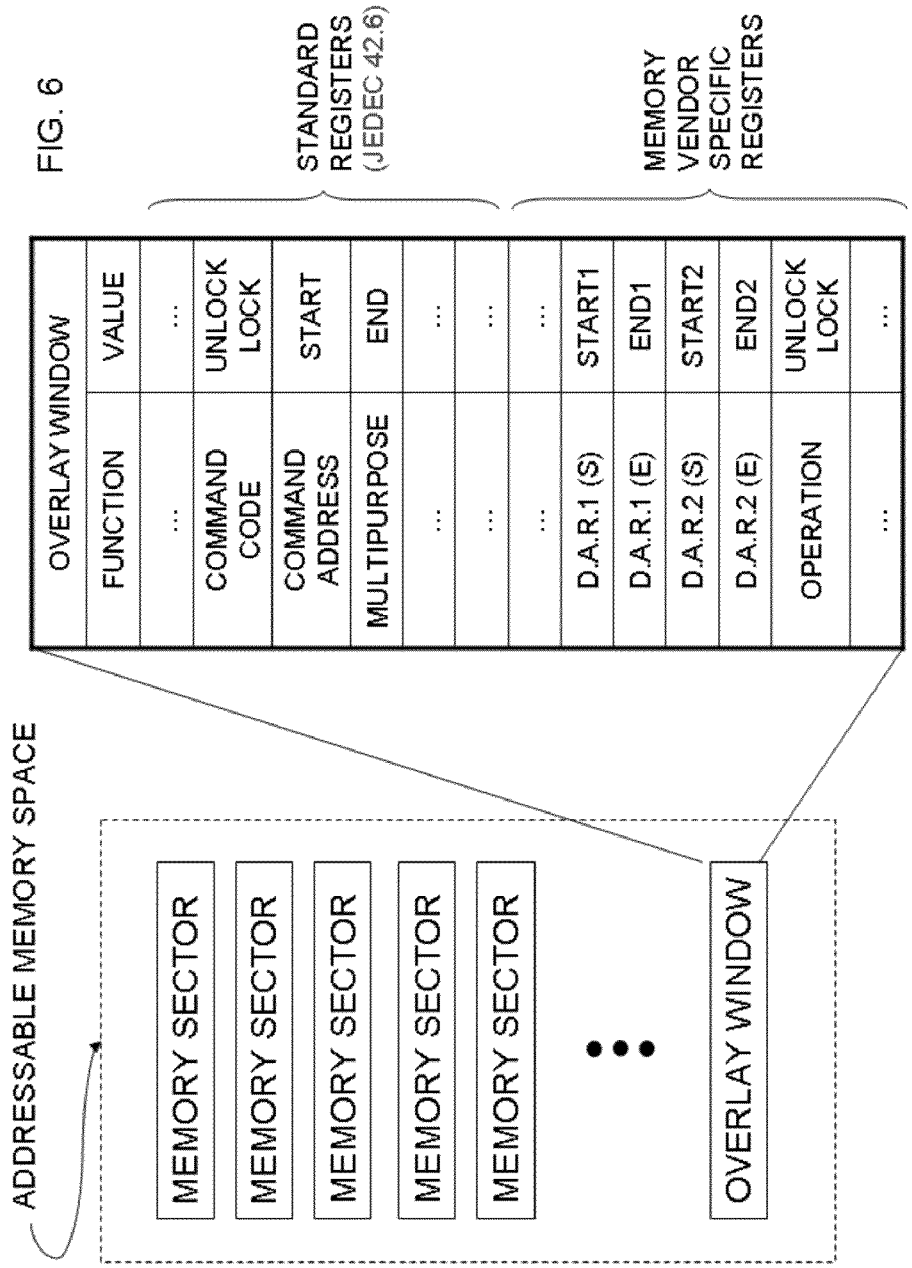
FIG. 6 illustrates the organization of the overlay window according to an embodiment of the invention.

FIG. 6 illustrates an embodiment of the invention according to which an overlay window with appropriate organization is used to receive and store, among other information, the start and the end address and to receive the unlock or the lock commands for execution.

In a memory device the addressable memory space (see left side of FIG. 6) comprises the memory available to the user (i.e., the physical non-volatile memory to store data in the chip, that is typically divided in a plurality of partitions and/or of memory sectors) and an overlay window, that is used for different functions of the device (i.e., for the command code, for the command address, command data, etc.). The mapping of the overlay window within the addressable memory space is not relevant for the solution described.

Typically the overlay window comprises a plurality of registers according to a standard organization, such as that described in the JEDEC 42.6 standard (FIG. 6, right hand side view of the overlay window refers to such a standard, but it is understood that it is a non-limiting example), and a plurality of registers that are vendor specific, i.e., each device manufacturer specifies their organization and use according to the functions specified in the data-sheet.

According to one embodiment, a command value is written to the COMMAND CODE register (UNLOCK or LOCK in the representation of FIG. 6) to instruct the device about the operation to be performed, the start address (START) of the region to be unlocked or locked is written to the COMMAND ADDRESS register, and the end address (END) of the region is written to the MULTIPURPOSE register (typically available within the standard registers of the overlay window, depending on its organization). When the command is executed the region is unlocked (or locked) and correspondingly it is available for (or inhibited from) data modification.

According to another embodiment, the start and the end address of each region is written to corresponding registers in the vendor specific plurality of registers. For example, with reference to FIG. 6, region1 addresses (START1, END1) are written to DYNAMIC ALLOCABLE REGION1 (Start) and DYNAMIC ALLOCABLE REGION1 (End) registers, respectively, i.e. registers D.A.R.1(S) and D.A.R.1(E). Region 2 addresses are written to D.A.R.2(S) and D.A.R.2(E) and, in a similar way, a pair of additional registers is used for each other region. The command code value (UNLOCK or LOCK) is written to the OPERATION register.

It should be understood that while FIG. 6 depicts both the embodiments described in detail above with reference to the same table representing the overlay window only one of the two is used. However, all possible combinations of standard registers and vendor specific registers may be used to produce the same effect. Moreover, all possible standards are suited to be used with corresponding adaptations, so that JEDEC 42.6 is only an example and is not limiting; in particular the vendor specific plurality of registers may be organized as described above whichever standard is adopted.

FIGS. 7A and 7B illustrate a specific example of the organization of the overlay window according to another embodiment of the invention compliant to the LPDDR2-NMV standard (JEDEC 42.6). The table reports the relevant information in the format used in a typical data-sheet, including byte addressing (both offset and number of bytes), type (R=read, W=write), register item and default value.

In one embodiment, additional protection is obtained by preventing the protection state from being changed by software alone. In this embodiment, a Write Protection Pin (WP#, not shown in the Figures) is hardware enabled, i.e., by setting it to the "1" logic state. When the WP# pin is in the "0" logical state a unlock command is not executed, while when WP# is in the "1" logic state a modification of the protection state is allowed; an opposite convention may be used to inhibit and to enable modification of locked or unlocked state. The start and the end address of the region(s) to be unlocked are stored in the appropriate registers as described above with reference to the different possible embodiments.

Figure 8:
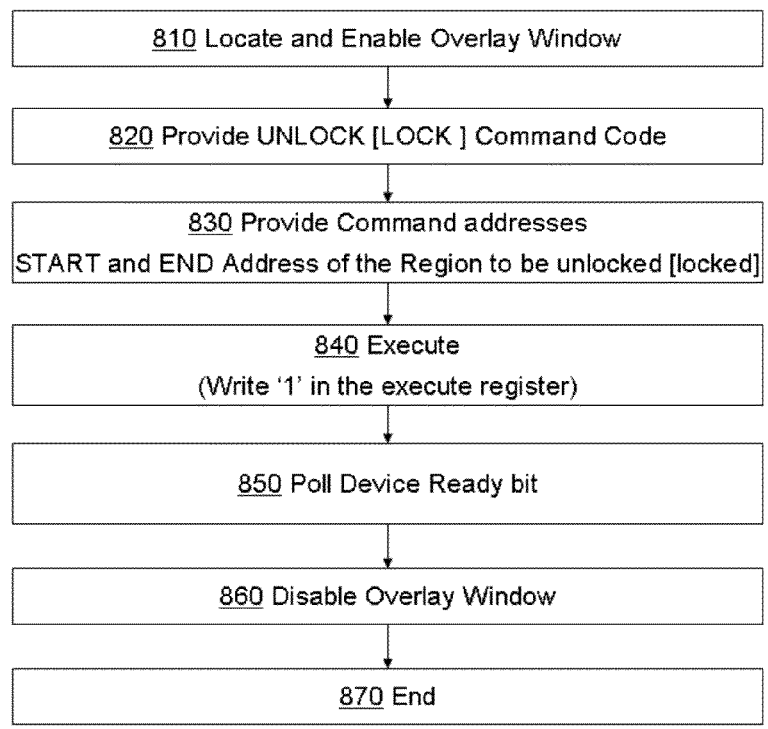
FIG. 8 illustrates a flow diagram to carry out an unlock-lock sequence according to an embodiment of the invention.

FIG. 8 illustrates a schematic flow diagram of a method to carry out an unlock or a lock operation within an unlock-lock sequence according to one embodiment of the invention. At block 810 the overlay window is located and enabled. At block 820 the command code value (either UNLOCK or LOCK) is written to the appropriate register for the region to be locked or unlocked. At block 830 the command address values (both START and END addresses) of the region(s) to be unlocked (or locked) are written to the appropriate registers. As described above, for locking, the region ID may alternatively be written when locking a region. At block 840 the lock or unlock command is executed (for example by writing "1" into the EXECUTE register). At block 850 polling of the DEVICE READY bit is done until confirmation of execution completion is asserted. At block 860 the overlay window is disabled and the operation ends at block 870.

The "appropriate register(s)" referred to above may be those registers described in FIG. 6 or in FIGS. 7A and 7B, whichever device embodiment is considered, and/or all possible variations thereof.

The method may be adapted to all the embodiments described before with reference to FIG. 4, 5, or 6. More specifically the command addresses written at block 830 may be the start and the end address of a single region, or the start and end addresses of multiple regions within the same partition (up-to the maximum number allowed), or the start and the end address of multiple regions in different partitions (either with the limit imposed by the maximum number in each partition, see FIG. 4, or only limited by the total number of available registers independently of the position of the region, see FIG. 5).

Moreover, the type of memory in the non-volatile memory device may one of several different types. In particular Phase Change Memory cells, or Ferroelectric Memory cells or Magnetic Memory cells may be selected.

In an embodiment, rules are defined and applied to determine when the unlock or the lock commands are executed. For example, in an unlock command the address range of the region to be unlocked should not overlap an already unlocked region. If this rule is not satisfied, an error message is delivered and the unlock command is not executed. In a lock command, in case of mismatch between the start/end address supplied with the lock instruction and the start/end address of unlocked regions, an error message may be output to the user and the lock command is not executed because it is not clear which region should be locked. In a similar way other different or additional rules may be defined and implemented.

The present invention has been disclosed and described by way of some embodiments; however it is apparent to those skilled in the art that several modifications to the described embodiments, as well as other embodiments of the present invention are possible without departing from the scope thereof as defined in the appended claims.

The invention claimed is:

1. A method comprising:
receiving at least one address of at least one memory cell of a memory device to be locked, wherein when a memory cell of the memory device is locked data stored by that cell cannot be modified by a user, wherein the receiving the at least one address comprises receiving a range of addresses of memory cells defining a region of memory cells to be locked, and wherein the receiving the range of addresses comprises receiving a start address to define a first boundary of the region;
receiving a lock command to lock the at least one memory cell of the memory device; and
executing the lock command to lock the at least one memory cell of the memory device.

2. The method of claim 1, wherein the receiving the range of addresses further comprises:
receiving an end address to define a second boundary of the region.

3. The method of claim 1, wherein the memory device comprises:
a plurality of partitions, wherein each partition has a plurality of addresses to store data; and
at least one register to receive the lock command and the at least one address of the at least one memory cell to be locked.

4. The method of claim 3, wherein the at least one register further comprises:
a plurality of registers, wherein each partition of the plurality of partitions is associated with at least one register of the plurality of register.

5. The method of claim 1, wherein the receiving the range of addresses of memory cells defining the region of memory cells to be locked comprises:
receiving a region identifier, wherein the memory device is partitioned into different regions of addresses; and
identifying a region to be locked based on the region identifier.

6. A method comprising:
receiving at least one address of at least one memory cell of a memory device to be locked, wherein when a memory cell of the memory device is locked data stored by that cell cannot be modified by a user;
receiving a lock command to lock the at least one memory cell of the memory device;
executing the lock command to lock the at least one memory cell of the memory device
defining a rule to be matched by the received at least one address; and
outputting an error message when the rule is not matched.

7. A memory device comprising:
a data region of independently addressable memory cells to store data, wherein the data region is partitioned into a plurality of regions;
an information region to receive information associated with at least one addressable memory cell of a region to be locked, wherein the information is indicative of a position and a range of the region to be locked, and wherein the information region comprises a first register to receive a start address of the region to be locked.

8. The memory device of claim 7, wherein the information region further comprises a second register to receive an end address of the region to be locked.

9. The memory device of claim 7, wherein the information region comprises:
a plurality of registers divided in sub-pluralities to receive the information, wherein each register of each sub-plurality is associated to a corresponding partition in the data region.

10. The memory device of claim 7, wherein the information region comprises:
a plurality of registers and each register of the plurality of registers is associated to a particular region to be locked.

11. The memory device of claim 7, wherein the information region is part of an overlay window.

12. The memory device of claim 11, wherein the overlay window comprises memory vendor specific registers to receive the information.

13. The memory device of claim 11, wherein the memory device conforms to a JEDEC 42.6 standard.

14. The memory device of claim 7, further comprising:
a validity bit associated to a first register to assert/de-assert a validity of data contained in the first register.

15. The memory device of claim 7, further comprising:
a write protection connection to enable data modification only if a pre-defined logic value is applied to the write protect connection.

16. The memory device of claim 7, wherein the memory cells of the data region are one of phase change memory cells, ferroelectric memory cells, or magnetic memory cells.

17. A system comprising:
a processor;
a memory coupled to the processor, wherein the memory includes:
a data region of independently addressable memory cells to store data, wherein the data region is partitioned into a plurality of regions;
an information region to receive information associated with at least one addressable memory cell of a region to be locked, wherein the information is indicative of a position and a range of the region to be locked, and wherein the information region comprises a first register to receive a start address of the region to be locked.

* * * * *